Feb. 18, 1964
C. I. WASSERMAN
3,121,806
ELECTRONIC CODE COMPARATOR
Filed Feb. 3, 1960
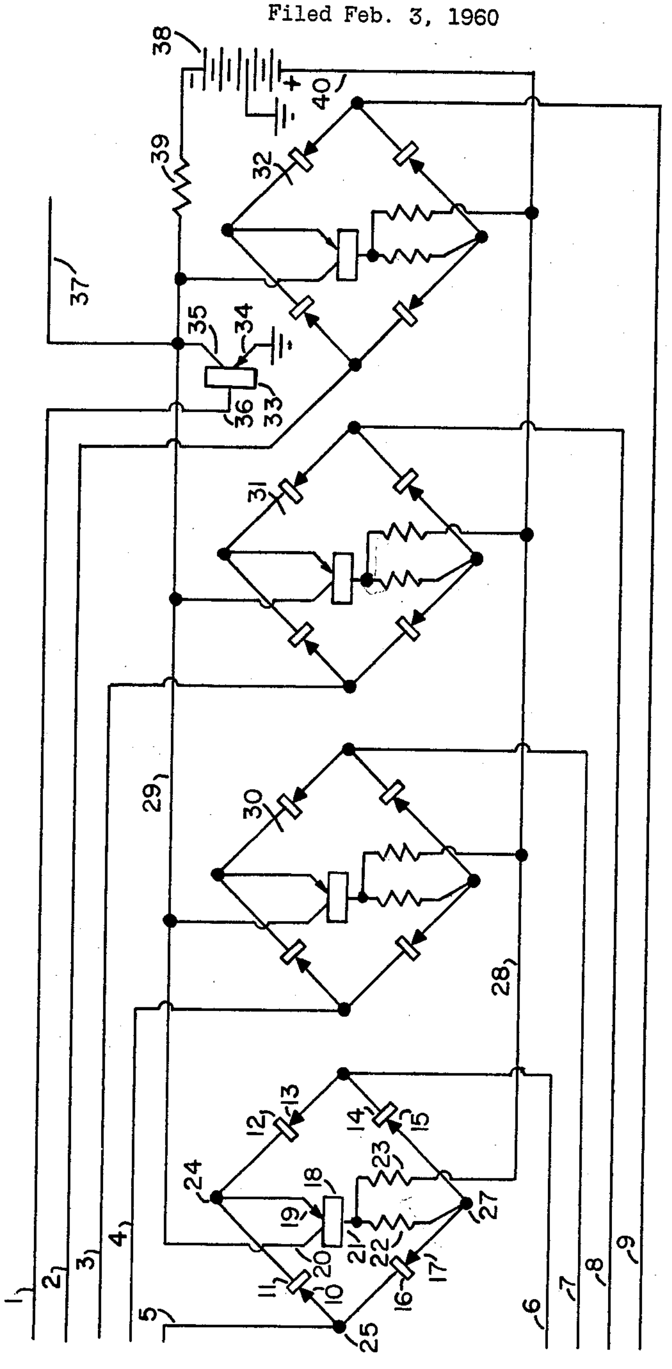
*INVENTOR.*
CARL I. WASSERMAN
*BY* Alfred W. Barber
ATTORNEY United States Patent Office 3,121,806

Patented Feb. 18, 1964

3,121,806
ELECTRONIC CODE COMPARATOR

Carl I. Wasserman, Queens Village, N.Y., assignor to Potter Instrument Co., Inc., Plainview, N.Y., a corporation of New York Filed Feb. 3, 1960, Ser. No. 6,450
3 Claims. (Cl. 307—88.5)

The present invention concerns electronic comparison systems and, in particular, system for comparing characters represented by binary coded numbers.

In the field of electronic computers there are many instances where it is necessary to compare characters usually represented by numbers in a four or six bit or more binary code. A four bit code will represent up to 16 different characters while a six bit code will represent up to 64 different characters. Typical uses for such comparison devices are in tape searching where an address represented by a particular coded number or numbers is set up and a tape is searched for a corresponding number or numbers representing the address of recorded information; and in a high speed printer where a character to be printed is set up in the form of coded number and positions of the print wheel are represented by coded numbers so that when a match is found, a print instruction is given. In each case the numbers to compared are represented by patterns of voltage, usually of two values. For purposes of illustration, but not limiting the disclosed combinations in any way, the assumption will be made that the voltage values are zero for logical "0" and minus 10 volts for logical "1." A device for yielding a four bit code may, for example, have four leads each one of which is at either zero potential or minus 10 volts. A six bit code device would have six leads, etc.

Briefly, the present invention consists in a plurality of diode bridges, one for each bit of the code to be compared, one input to one corner of each bridge and the second input, i.e., the one to be compared to the diagonal corner of each bridge; an output transistor coupler connected across the other diagonal of each bridge and a common output transistor receiving parallel output from all of the bridge connected transistors. A common collector bias is provided for all the transistors and a common cut-off bias is applied to all the bridge connected transistors. This arrangement is very simple and effective requiring a minimum of component parts yet providing sensitive, accurate, high speed and particularly reliable results.

The principal objective of the present invention is to provide a method of and means for comparing binary coded information to determine whether or not a match exists.

Another object is to provide a simple and effective comparison device with a wide tolerance of matching signals.

Still another object is to provide a reliable comparison circuit which yields a definite indication of match in the presence of disturbing factors such as noise or matching voltages which are not exact.

These and other objects will be apparent from the detailed description of the invention given in connection with the figure of the drawing.

In the drawing is shown the preferred from of the present invention.

The drawing shows two sets of four leads 2, 3, 4, 5 and 6, 7, 8 and 9. These leads are connected to diagonal points of diode bridges, the first bridge consisting of diodes 10—11, 12—13, 14—15, 16—17, transistor 18 and resistors 22 and 23, and the other three bridges 30, 31 and 32 being similar. Lead 5 connects to point 25 at the junction between diodes 10—11 and 16—17 while comparison lead 6 connects to the opposite diagonal point. A source of bias voltage 38 which supplies positives and negative bias voltages by being grounded at some intermediate point provides a negative bias through resistor 39 and over lead 29 to collector 20 of transistor 18 and similarly to the collectors of the other bridge transistors and a positive bias over leads 40 and 28 to base 21 of transistor 18 through resistor 23 and to the bases of the other bridge transistors through similar registors. Emitter 19 of transistor 18 is connected to point 24 which is the junction between diodes 10—11 and 12—13 while base 21 is connected through resistor 22 to point 27 which is the junction between diodes 14—15 and 16—17. Similar connections are made between emitters and bases of the three other bridge transistors to their respective bridges. Lead 37 at the junction between resistor 39 and lead 29 may be considered the output point of this comparison device and assumes a substantial negative voltage to indicate a match between inputs on leads 2—5 and 6—9 and a substantially zero or ground potential to indicate a mis-match between any two leads comprising a pair, i.e., between 5 and 6, 4 and 7, 3 and 8 or 2 and 9. When all the transistors are non-conducting, little or no current will flow in resistor 39 and output lead 37 will be at substantially the negative potential of the end of bias supply 38. When one or more of the transistors is conducting, however, current will flow in resistor 39 and lead 37 will be placed at a low potential near zero or ground.

For purposes of illustration, assume that the voltages on leads 2—5 and 6—9 which are to be matched are combinations made up of 0 and −10 volts. As will be shown below there is considerable tolerance of these voltages for example 0 may actually be plus or minus 2 volts, say, and −10 may be anything from 8 to −12 volts. Assume lead 5 carries 0 volt and lead 6 carries −10 volts. Under these conditions point 25 is positive with respect to the junction between diodes 12—13 and 14—15 which causes current to flow from point 25 through diode anode 10 to cathode 11, through transistor emitter 19 to base 21, through resistor 22 to point 27 and through diode anode 15 to cathode 14. Since this is a forward bias current through the transistor, transistor 18 will conduct drawing current at collector 20 through resistor 39 and collapsing the potential of output point 37 to near zero indicating a mis-match between the input voltages. Now consider a mismatch in the reverse direction in which lead 5 is at −10 volts and lead 6 is at 0. Under these conditions current will flow from anode 13 to cathode 12, from emitter 19 to base 21, through resistor 22, and from anode 17 to cathode 16 back to lead 5 again the forward bias on transistor 18 causing it to conduct and collape the output voltage at lead 37. Now suppose both leads 5 and 6 are at zero potential under which circumstances they apply no bias to the diode bridge and its transistor. When this condition exists, the positive bias from bias source 38 is operative through resistor 23 to base 21 and transistor 18 is cut-off and since no current flows through resistor 38 to collector 20, output lead 37 will be at a negative potential equal to the potential of the negative end of bias source 38. It will be noted that this output voltage indicating a match will be maintained even if the voltages on leads 5 and 6 are not exactly zero and, in fact, the positive bias through resistor 23 may be such as to provide the match indication for a range of voltage around zero say plus or minus one to three volts as a matter of design. Again consider the case when the voltages on leads 5 and 6 are both minus 10 volts. Here minus 10 volts represents one condition the other of which is represented by zero. With point 25 and its diagonal both at minus 10 volts, point 27 becomes minus 10 by conduction from cathode 16 to anode 17 and from cathode 14 to anode 15 and base 21 becomes negative by current flowing through resistor 22 thereby emitter 19 follows. With emitter 19 highly negative, no current flows in collector 20 and the output lead 37 is negative indicating a match. Again if either lead 5 or lead 6 is not exactly minus 10 but is, for example, minus 8, emitter 19 will assume this less negative voltage but still sufficient to provide a match indicating negative voltage on lead 37. Here again design may be such that minus 10 volts may be anywhere in a predetermined range of the order of one to 3 volts around minus 10 volts. The mode in which the system operates to indicate a match between the voltages on leads 5 and 6 has been described. The operation is similar for leads 4 and 7 connected to bridge 30, leads 3 and 8 connected to bridge 31 and leads 2 and 9 connected to bridge 32. It will be seen that a mis-match in any of these pairs will collapse the voltage on lead 37 indicating the existance of a mis-match. On the other hand, if the two voltages on each of the two wires of each pair are equal, for example, 0—0, −10—10, —10—10, and 0—0, no conduction will exist in any of the four transistors and lead 37 will be negative indicating matching. Any reasonable number of pairs of wires may be monitored in this manner. In most cases, a four bit code system will utilize four bridge circuits at a time or connected to one output lead, and a six bit code system will utilize six bridge circuits. A single bridge may be useful for many applications where a match between just two quantities is desired.

One additional device is shown connected to the circuit for inhibiting purposes. This may conveniently consist in transistor 33 having collector 25 connected to the junction between resistor 39 and lead 29, emitter 34 connected to ground and base 36 connected to input lead 1. With zero potential on lead 1, transistor 33 is non-conducting and has no effect on the system. However, if a negative voltage is applied to lead 1, transistor 33 conducts, lowering potential of lead 37 so that the output indicates a mis-match and the system is inhibited from indicating a match.

While the circuit shows and the above describes the use of PNP transistors, it will be evident that if all polarities are reversed in bias supplies and match lines, and all diodes reversed, that NPN transistors may be used in the system without in any way changing its mode of operation. In the same way other semi-conductor or equivalent rectifying junctions may be utilized as the bridge elements. The function and requirement of each of the four arm elements of the bridge is that each passes current in one direction and substantially blocks in the reverse direction.

While only one form of the present invention has been shown and described, many modifications will be apparent to those skilled in the art and within the spirit and scope of the invention as set forth specifically in the appended claims.

What is claimed is:

1. In a system for indicating a match between voltage conditions of a plurality of pairs of circuits, the combination of,
   - a predetermined number of diode bridges equal to the number of pairs of circuits,
   - each of said diode bridges connected electrically in the manner of a full wave rectifier,
   - first circuit means to connect each pair of the plurality of pairs of circuits to respective diode bridges at first diagonally opposite points,
   - a transistor switch element for each diode bridge having emitter, collector and base terminals,
   - a means to connect the emitter and base terminals of each switch element to second diagonally opposite points of respective diode bridges,
   - a source of electrical potential having negative and positive terminals,
   - second circuit means to connect the negative terminal of the electrical potential in common to each of the collector terminals,
   - third circuit means to connect the positive terminal of the electrical potential in common to each of the base terminals, and
   - a single output connection from the common second circuit means,
   - whereby an output voltage having a first predetermined characteristic is developed when matching signals appear in each pair of the plurality of circuit pairs, and a second predetermined characteristic is developed at the single output connection when at least one pair of the circuit pairs has unmatching signals.

2. In a system as set forth in claim 1 including an an inhibit circuit means connected to prevent the development of said first predetermined characteristic.

3. In a system as set forth in claim 2, the inhibit circuit means including a transistor switching element having a collector terminal connected to said single output connection, an emitter terminal connected to ground and a base terminal connected to receive an inhibit signal.

References Cited in the file of this patent

UNITED STATES PATENTS

| | | |
|---|---|---|
| 2,641,696 | Woolard | June 9, 1953 |
| 2,715,718 | Holtje | Aug. 16, 1955 |
| 2,866,909 | Trousdale | Dec. 30, 1958 |
| 2,879,411 | Faulkner | Mar. 24, 1959 |
| 2,935,674 | Hohne | May 3, 1960 |

OTHER REFERENCES

Junction Transistor Electronics, by Hurley, pub. by John Wiley, New York, 1958, page 396, FIG. 20.14(*b*) TK7872, T76H86.